July 15, 1969 C. R. THOMAS 3,455,045
DECORATIVE EXHIBIT AND METHOD OF PRODUCING SAME
Filed Sept. 28, 1964 2 Sheets-Sheet 1
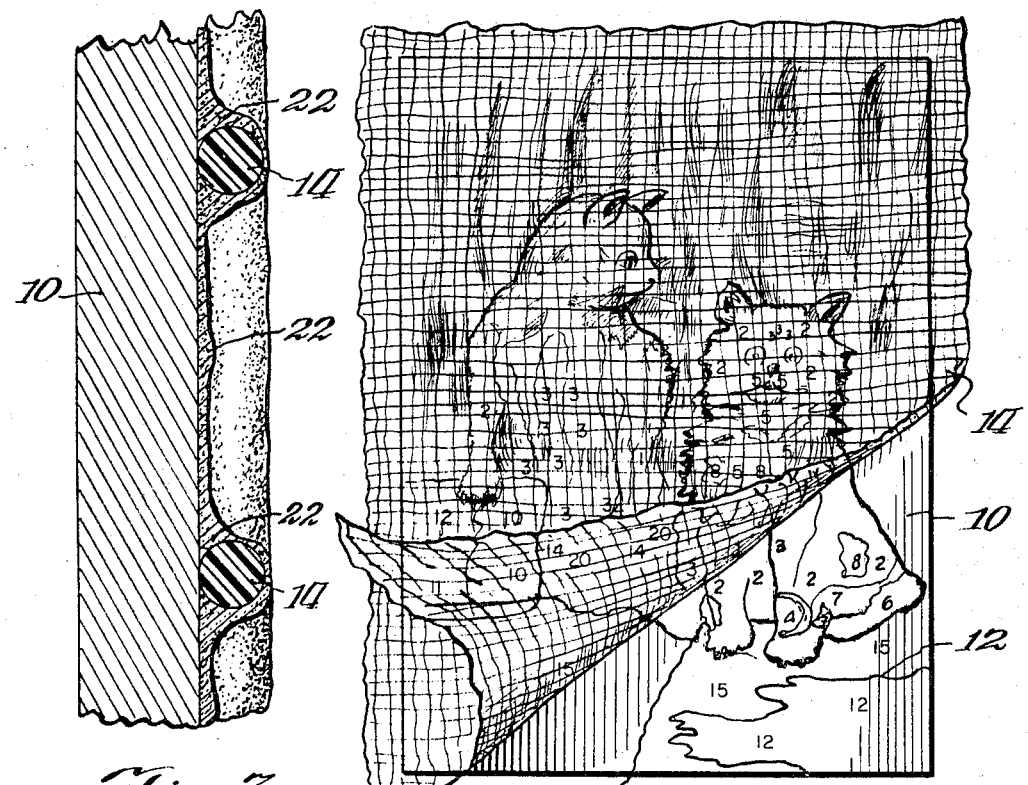
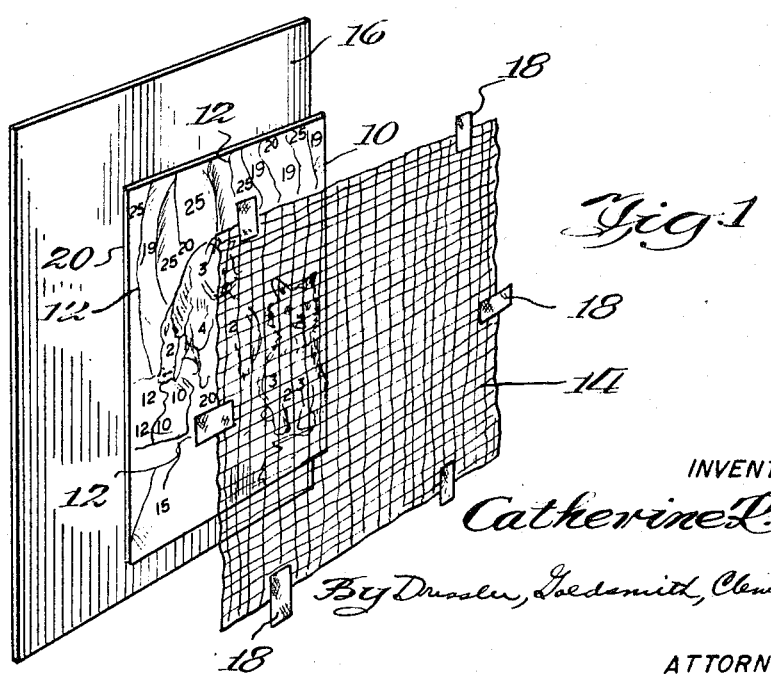
INVENTOR.
Catherine R. Thomas
ATTORNEYS.

July 15, 1969  C. R. THOMAS  3,455,045
DECORATIVE EXHIBIT AND METHOD OF PRODUCING SAME
Filed Sept. 28, 1964  2 Sheets-Sheet 2

INVENTOR.
Catherine R. Thomas
By Dressler, Goldsmith, Clement, Gordon & Lall
ATTORNEYS.

United States Patent Office 3,455,045
Patented July 15, 1969

3,455,045
DECORATIVE EXHIBIT AND METHOD OF PRODUCING SAME
Catherine R. Thomas, 2630 W. Rice St., Chicago, Ill. 60622
Filed Sept. 28, 1964, Ser. No. 399,674
Int. Cl. G09f 7/00
U.S. Cl. 40—135                       4 Claims

ABSTRACT OF THE DISCLOSURE

A decorative exihibit in which a net, having a design corresponding to the design on a surface, is positioned a perpendicular distance from the plane of the surface so that an observer can simultaneously see the corresponding designs on the net and the surface.

---

This invention relates to a novel method of producing a decorative exhibit, and more particularly to a method of making an exhibit with the use of a scrim or net which imparts a pleasing and unusual appearance to the resulting product. As used in this application, the term "scrim" describes a light textile material such as linen, cotton, or the like (but not limited to those materials) which has been woven into meshes. The term "net" includes "scrim," but additionally encompasses metal mesh and the like.

Although the embodiments illustrated in the application pertain to artistic paintings, it is to be understood that no limitation with respect to the type of exhibit is intended.

The exhibit in accordance with the present invention is produced by placing a net in contact with a background surface and applying a paint having a film-forming ingredient to the scrim and background surface simultaneously. Upon subsequent drying of the paint the net will be affixed to the surface and an unusual exhibit having a mosaic appearance will result therefrom.

In another form of the invention a net to be painted is placed over a surface having lines to guide the operator. A coloring material is applied to the net using the surface lines as a guide and the net is thereupon removed from the surface. This novel method produces an unusual exhibit having a phantom effect, particularly when the net is placed over a dark background. It was discovered that by placing a net which has been painted or otherwise partially colored over a background having a similar color to that of the basic (uncolored) net a resulting unusual phantom effect is achieved because the uncolored portions of the net seem to disappear, by blending into the background, when so positioned.

In a further embodiment white or light colored scrim or net is painted in accordance with the principles of the invention and placed over a relatively dark surface to achieve a decorative tapestry effect.

An outstanding "three-dimensional" effect occurs when the painted net is placed a small distance from the surface upon which it was painted, so that the observer may see both the design or figures on the net and the corresponding design or figures on the painted surface behind the net.

A more detailed explanation of the invention is provided in the following description and claims and is illustrated in the accompanying drawings which disclose the principles of the invention and the best mode contemplated of applying those principles.

In the drawings:

FIGURE 1 is an exploded view in perspective of means that may be employed to produce a decorative exhibit in accordance with one embodiment of the method of the present invention;

FIGURE 2 is a front elevation of a painting employing the method of the present invention, the net being partially lifted away to show three stages of development of the painting;

FIGURE 3 is a fragmentary enlarged cross sectional view of the painted surface and scrim, showing the scrim affixed to the painted surface;

Figure 7:
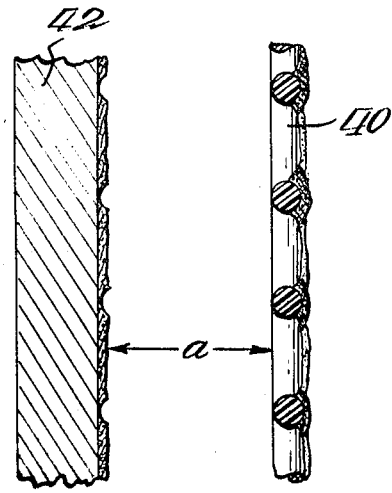
FIGURE 7 is a fragmentary enlarged cross sectional view of the painted surface and net, showing the net separated from and overlying the surface.

Referring to FIGURE 1, there is illustrated a background surface 10 of any suitable material to be painted, such as cardboard or canvas. The surface 10 contains guide lines 12 with numbers between the lines indicating the particular color of paint to be employed. A net 14 is placed in contact with the surface 10, for example by connection to a backing 16 by means of tape strips 18. Other suitable connecting means, such as staples, can be effectively used to affix the net to the backing 16 so that it will be in secure contact with surface 10. It is preferable to apply tension to the edges of the net to insure substantially continuous contact between the net and surface.

In another form of the invention net 14 can be placed in secure contact with the surface 10 by bending the edge portions of the net over the surface to be painted and affixing the net edge portions to the underlying edge portions 20 of the surface 10 by any suitable connecting means. If the net is not secured properly to the surface or backing, the subsequent brush application to the net and surface may cause substantial movement of the net, thereby resulting in undesirable smears.

As shown most clearly in the upper portion of the exhibit illustrated in FIGURE 2, a paint having a film-forming ingredient such as a drying oil vehicle is applied to net 14 and background surface 10 at the same time. The lines 12 may be useful in guiding the operator and can be seen through the mesh of most nets.

FIGURE 3 shows a cross section of the painted net 14 against the background surface 10. It is apparent that the paint 22 which contains a drying oil vehicle affixes the net 14 to the surface 10 when it dries. In this manner the resulting painted surface has an unusual and pleasing appearance, and the method of producing such a surface is not readily apparent to most observers.

As a preferred embodiment, the net 14 comprises a scrim so that a relatively low viscosity paint can be employed without dampening the affixing power. Additionally, the scrim may be slightly distorted when the tension is applied to the edges, thus rendering an unusual artistic flavor to the exhibit.

Since substantially all of the scrim becomes affixed to the background surface it appears to contain numerous pieces of mosaic tile or other generally rectangular pieces continuously affixed to a backing to form the exhibit. The threads do not disappear from view even in the areas where the thread and a large portion of background surface are the same color. The crossed threads appear to be the grout which is generally apparent to the observer of a mosaic exhibit. Because the threads are on a different plane than the background surface, the shadows formed adjacent the threads enhance their distinguishability. The paint formation caused by the surface tension of the paint adds to the surprising result which is achieved by this novel method.

By applying paint to the net and background simultaneously it is difficult to obtain precisely straight or smooth lines and this is advantageous to achieve a painting which appears to have the style of an experienced artist. In effect, therefore, the novel method of the present invention allows the novice to produce an interesting exhibit having a sophisticated style and a mosaic effect.

Figure 4:
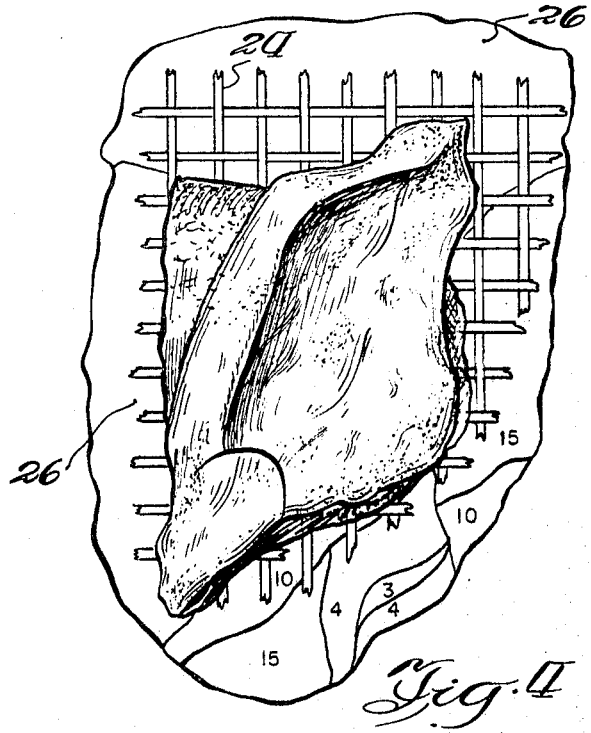
FIGURE 4 is an enlarged elevation of a portion of net over a surface with guide lines wherein coloring has been applied to both the net and surface.
Figure 5:
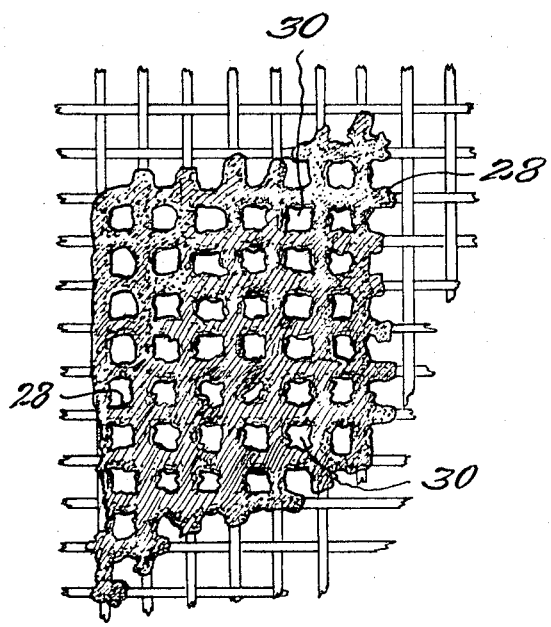
FIGURE 5 is an enlarged elevation of the net of FIGURE 4 subsequent to coloring and removal from the background surface according to one embodiment of the method of this invention.
Figure 6:
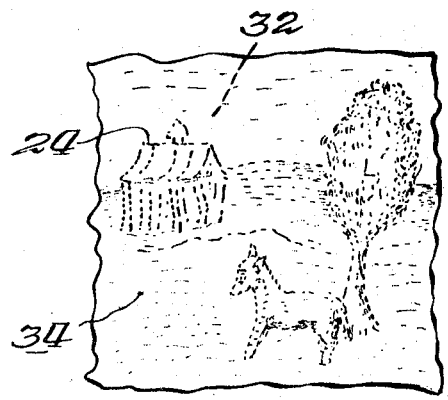
FIGURE 6 is a front elevation of the phantom-like exhibit resulting from said embodiment of the method of the present invention.

FIGURES 4–6 illustrate a phantom exhibit produced by the novel method of the present invention. The unusual phantom-like picture is produced with the use of a scrim or net 24 which may be composed of any suitable material. As a specific example, a net of a size between about 4 mesh and about 80 mesh was found suitable. In a preferred embodiment, a net size between about 6 mesh and about 16 mesh is employed to obtain effective results. As used herein, the term "mesh" is defined as number of threads per linear inch.

To produce the phantom exhibit the net 24 is placed against a suitable backing 26 of cardboard or any other discardable material. It is preferred that the backing 26 have lines thereon to provide a guide for the operator. A board with numbers to designate the colors to be used provide a simple arrangement for the novice.

A suitable coloring is applied to the net and backing by the operator as shown in FIGURE 4 which illustrates the left ear of the horse illustrated in FIGURE 6. It is preferred that the coloring material be of a substantially permanent nature such as paint having a drying oil vehicle.

After completion of the coloring, the net 24 is removed from the backing 26 and the paint is allowed to dry thereupon. As shown most clearly in FIGURE 5, the paint 28 adheres to the net but substantial mesh openings 30 remain. When the net is placed adjacent a preferably dark background, an interesting phantom effect is achieved.

In a preferred embodiment the basic net (prior to coloring) is substantially the same color as the background 32 adjacent thereto. The uncolored portions of the net tend to blend into the background and hence disappear, and a striking result is achieved. A black net in conjunction with a black background has been found highly effective to produce the phantom picture 34 illustrated in FIGURE 6.

To provide a simple phantom exhibit suitable for framing, the colored net can be placed upon a dark background material such as black felt. The result is most attractive to the observer.

In another form of the invention the method is used with a preferably light colored scrim whereby an unexpected effect is achieved when the scrim is placed over a dark background. In this embodiment the scrim does not tend to disappear but, on the other hand, the contrast between the painted scrim and the dark background causes a highly decorative tapestry effect. The scrim used to achieve the tapestry effect should be of relatively close mesh (preferably at least 12 mesh) although it is necessary that the mesh openings be large enough to enable the operator to view the surface guide lines through the scrim.

A decorative "three dimensional" effect is observed when a net having a relatively close mesh is painted in accordance with the principles of the invention, removed from the painted surface either before or after drying of the paint, and placed at a small distance from the surface. This expedient is illustrated in FIGURE 7 wherein a painted net 40 is shown positioned at a distance $a$ from painted surface 42. The optimum separation distance will depend upon the size of the exhibit and the average distance of the observer from the exhibit. Maximum uniformity of effect is obtained when the net is positioned parallel to the surface.

Positioning the net and surface as stated above will, as a result of the pehnomenon of parallax, provide a "three-dimensional" effect when the observer is situated so as to simultaneously view the corresponding design or figures on both the net and the surface. If desired, the net may be positioned so that the corresponding figures or designs on the net are physically laterally offset from the corresponding figures or designs on the surface, by an amount which again depends upon the size of the exhibit and the average distance of the observer from the exhibit.

In a specific embodiment in which a surface having a length of fourteen inches and a width of eleven inches was exhibited, and the observer was positioned approximately five feet from the exhibit, the separation distance $a$ was 0.25 inch. It it preferable that distance $a$ not exceed one inch.

To enhance the effect, it is preferred to use a net which is twenty-mesh or closer. In this manner, the design or figure on both the surface and the net will have substantial brilliance providing an optimum "three-dimensional" effect. A 32 mesh nylon net was found to provide a highly successful result in a specific embodiment.

What is claimed is:

1. A method of producing a decorative exhibit which includes the steps of placing a net in contact with a background surface, applying coloring substance to said net and at the same time applying coloring susbtance to said background surface, removing said net from said background surface and positioning said net adjacent to and spaced from the plane of said background surface whereby an observer can simultaneously see the corresponding colored areas of the net and of the background surface.

2. A method of producing a decorative exhibit which includes the steps of placing a net in contact with a background surface, applying coloring substance to said net and at the same time applying coloring substance to said background surface, removing said net from said background surface and positioning said net adjacent to and spaced about 0.25 inch from the plane of said background surface whereby an observer can simultaneously see the corresponding colored areas of the net and of the background surface.

3. A method of producing a decorative exhibit which includes the steps of placing a net in contact with a background surface, applying coloring substance to said net and at the same time applying coloring substance to said background surface, removing said net from said background surface and positioning said net adjacent to and spaced less than one inch from the plane of said background surface whereby an observer can simultaneously see the corresponding colored areas of the net and of the background surface.

4. A decorative exhibit which comprises: a surface having a coloring substance affixed thereto, said coloring substance forming a design and having indented portions in which parts of said coloring substances are absent; a net having a rear surface facing said first-mentioned surface and a front surface facing away from said first-mentioned surface, said net having said absent parts of said coloring substance affixed to its front surface; said net being positioned a perpendicular distance from the plane of said first-mentioned surface whereby an observer can simultaneously see the designs on both said net and said surface.

References Cited

UNITED STATES PATENTS

| | | | |
|---|---|---|---|
| 598,537 | 2/1898 | Rosenzweig | 40—135 X |
| 1,512,010 | 10/1924 | Runcie | 161—3 |
| 1,729,842 | 10/1929 | Pistocco | 117—38 |
| 1,766,811 | 6/1930 | Campbell | 161—413 X |
| 3,030,721 | 4/1962 | Ferrari | 117—38 |
| 1,781,313 | 11/1930 | Blau | 40—152 X |
| 1,908,772 | 5/1933 | Lowenthal | 40—152 X |
| 2,151,055 | 3/1939 | Stark | 40—152 X |
| 2,577,320 | 12/1951 | Fenyo | 40—152 X |

DAVID KLEIN, Primary Examiner

U.S. Cl. X.R.

117—8.5, 38; 156—59